US012632678B1

(12) United States Patent
Day

(10) Patent No.: US 12,632,678 B1
(45) Date of Patent: May 19, 2026

(54) TERMINAL CONTACTLESS AND AUDIO ACCESSIBILITY

(71) Applicant: Cardtronics USA, Inc., Atlanta, GA (US)

(72) Inventor: Philip Noel Day, Fife (GB)

(73) Assignee: Cardtronics USA, Inc., Atlanta, GA (US)

( * ) Notice: Subject to any disclaimer, the term of this patent is extended or adjusted under 35 U.S.C. 154(b) by 0 days.

(21) Appl. No.: 19/187,203

(22) Filed: Apr. 23, 2025

(51) Int. Cl.
*G06K 7/015* (2006.01)
*G06F 3/01* (2006.01)
*G06F 3/16* (2006.01)

(52) U.S. Cl.
CPC ............. *G06K 7/015* (2013.01); *G06F 3/016* (2013.01); *G06F 3/165* (2013.01)

(58) Field of Classification Search
CPC .......... G06K 7/015; G06F 3/016; G06F 3/165
USPC ........................................................ 235/451
See application file for complete search history.

(56) References Cited

U.S. PATENT DOCUMENTS

| | | | | |
|---|---|---|---|---|
| 9,104,271 | B1 * | 8/2015 | Adams | ................... G06F 3/0233 |
| 2014/0304663 | A1 * | 10/2014 | Mishra | ................... H04M 1/724 |
| | | | | 715/863 |

| | | | | |
|---|---|---|---|---|
| 2015/0135328 | A1 * | 5/2015 | Ellis | ...................... G06Q 10/10 |
| | | | | 726/26 |
| 2015/0279180 | A1 * | 10/2015 | Taylor | ..................... G08B 6/00 |
| | | | | 340/407.1 |
| 2016/0180636 | A1 * | 6/2016 | David | ................. G07F 17/3206 |
| | | | | 463/32 |
| 2025/0285442 | A1 * | 9/2025 | Shlomot | .............. G06F 3/0425 |

OTHER PUBLICATIONS

Cassidy et al, "A haptic ATM interface to assist visually impaired users", Oct. 21, 2013, ACM Digital Library, https://dl.acm.org/doi/10.1145/2513383.2513433.*

* cited by examiner

*Primary Examiner* — Michael G Lee
*Assistant Examiner* — David Tardif
(74) *Attorney, Agent, or Firm* — Schwegman Lundberg & Woessner, P.A.

(57) ABSTRACT

Improved contactless and audio accessibility at self-service terminals (SST) is provided for visually impaired and dexterity-limited customers. Raised tactile features, light patterns, and/or haptic feedback help customer locate and interact with contactless readers at the SSTs during self-service transactions. Contactless tokens are used as distance-based input devices with enhanced audio control features. These improvements make SSTs more accessible to users with various disabilities while maintaining the convenience benefits of contactless technology.

20 Claims, 3 Drawing Sheets

200

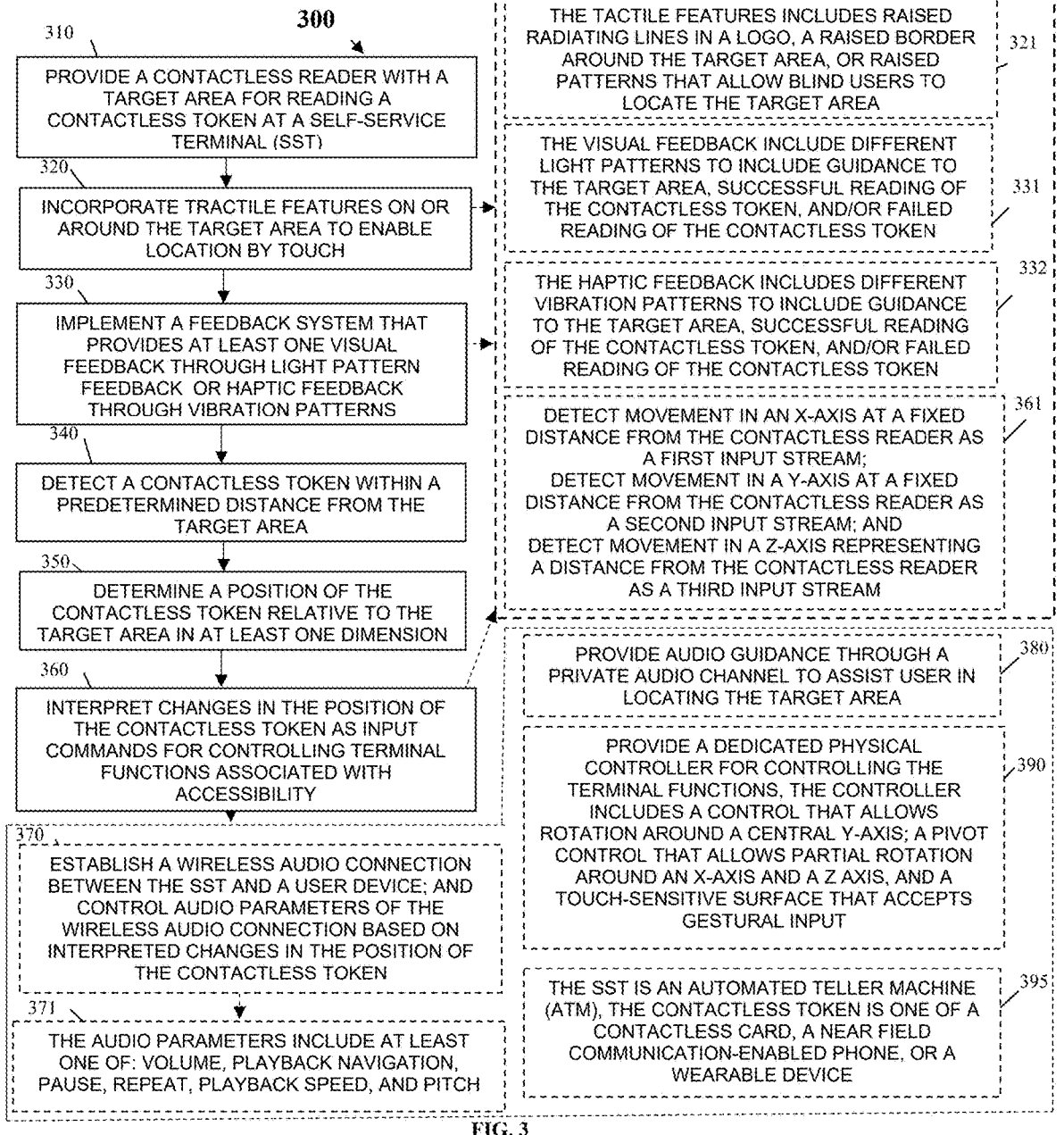

300

310
PROVIDE A CONTACTLESS READER WITH A TARGET AREA FOR READING A CONTACTLESS TOKEN AT A SELF-SERVICE TERMINAL (SST)

320
INCORPORATE TRACTILE FEATURES ON OR AROUND THE TARGET AREA TO ENABLE LOCATION BY TOUCH

330
IMPLEMENT A FEEDBACK SYSTEM THAT PROVIDES AT LEAST ONE VISUAL FEEDBACK THROUGH LIGHT PATTERN FEEDBACK OR HAPTIC FEEDBACK THROUGH VIBRATION PATTERNS

340
DETECT A CONTACTLESS TOKEN WITHIN A PREDETERMINED DISTANCE FROM THE TARGET AREA

350
DETERMINE A POSITION OF THE CONTACTLESS TOKEN RELATIVE TO THE TARGET AREA IN AT LEAST ONE DIMENSION

360
INTERPRET CHANGES IN THE POSITION OF THE CONTACTLESS TOKEN AS INPUT COMMANDS FOR CONTROLLING TERMINAL FUNCTIONS ASSOCIATED WITH ACCESSIBILITY

370
ESTABLISH A WIRELESS AUDIO CONNECTION BETWEEN THE SST AND A USER DEVICE; AND CONTROL AUDIO PARAMETERS OF THE WIRELESS AUDIO CONNECTION BASED ON INTERPRETED CHANGES IN THE POSITION OF THE CONTACTLESS TOKEN

371
THE AUDIO PARAMETERS INCLUDE AT LEAST ONE OF: VOLUME, PLAYBACK NAVIGATION, PAUSE, REPEAT, PLAYBACK SPEED, AND PITCH

321
THE TACTILE FEATURES INCLUDES RAISED RADIATING LINES IN A LOGO, A RAISED BORDER AROUND THE TARGET AREA, OR RAISED PATTERNS THAT ALLOW BLIND USERS TO LOCATE THE TARGET AREA

331
THE VISUAL FEEDBACK INCLUDE DIFFERENT LIGHT PATTERNS TO INCLUDE GUIDANCE TO THE TARGET AREA, SUCCESSFUL READING OF THE CONTACTLESS TOKEN, AND/OR FAILED READING OF THE CONTACTLESS TOKEN

332
THE HAPTIC FEEDBACK INCLUDES DIFFERENT VIBRATION PATTERNS TO INCLUDE GUIDANCE TO THE TARGET AREA, SUCCESSFUL READING OF THE CONTACTLESS TOKEN, AND/OR FAILED READING OF THE CONTACTLESS TOKEN

361
DETECT MOVEMENT IN AN X-AXIS AT A FIXED DISTANCE FROM THE CONTACTLESS READER AS A FIRST INPUT STREAM;
DETECT MOVEMENT IN A Y-AXIS AT A FIXED DISTANCE FROM THE CONTACTLESS READER AS A SECOND INPUT STREAM; AND
DETECT MOVEMENT IN A Z-AXIS REPRESENTING A DISTANCE FROM THE CONTACTLESS READER AS A THIRD INPUT STREAM

380
PROVIDE AUDIO GUIDANCE THROUGH A PRIVATE AUDIO CHANNEL TO ASSIST USER IN LOCATING THE TARGET AREA

390
PROVIDE A DEDICATED PHYSICAL CONTROLLER FOR CONTROLLING THE TERMINAL FUNCTIONS, THE CONTROLLER INCLUDES A CONTROL THAT ALLOWS ROTATION AROUND A CENTRAL Y-AXIS; A PIVOT CONTROL THAT ALLOWS PARTIAL ROTATION AROUND AN X-AXIS AND A Z AXIS, AND A TOUCH-SENSITIVE SURFACE THAT ACCEPTS GESTURAL INPUT

395
THE SST IS AN AUTOMATED TELLER MACHINE (ATM), THE CONTACTLESS TOKEN IS ONE OF A CONTACTLESS CARD, A NEAR FIELD COMMUNICATION-ENABLED PHONE, OR A WEARABLE DEVICE

FIG. 3

TERMINAL CONTACTLESS AND AUDIO ACCESSIBILITY

BACKGROUND

Self-service terminals (SSTs), particularly automated teller machines (ATMs), present accessibility challenges for blind and partially sighted users when implementing contactless payment technologies and wireless audio features. Contactless tokens (such as contactless cards, NFC-enabled mobile phones, or other devices) can offer accessibility benefits by reducing reach and manual dexterity requirements, but they pose significant challenges for visually impaired users because the contactless reader is often only distinguished by a flat, printed logo with no tactile features that blind people can feel. This accessibility issue is compounded by the Europay®, Mastercard®, and Visa® (EMV) company specifications for contactless readers, which enforce a standard logo without any tactile features being included. Similarly, wireless audio technologies (such as Bluetooth®, Wi-Fi, or others) that provide audio from the SST to personal devices offer benefits in terms of convenience by eliminating the need to be physically tethered to the terminal, but they also present challenges for blind and partially sighted people, particularly when using near field communication (NFC) 'tap' to initiate secure wireless pairing, as locating the appropriate NFC target can be difficult.

BRIEF DESCRIPTION OF THE DRAWINGS

FIG. 3 is a flow diagram of a method of enhancing accessibility of the contactless reader at the SST, according to an example embodiment.

DETAILED DESCRIPTION

Figure 1:
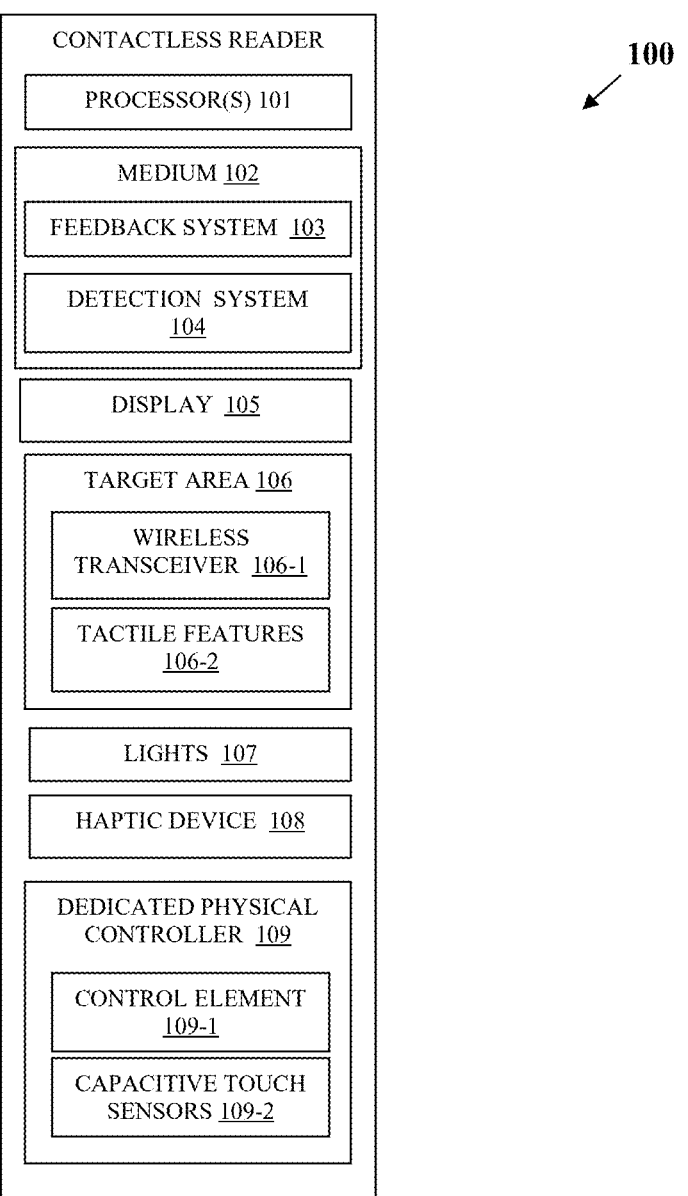
FIG. 1 is a diagram of a contactless reader, according to an example embodiment.

Self-service terminals (SSTs), such as automated teller machines (ATMs), increasingly incorporate contactless technologies to enhance user convenience. While these technologies offer significant benefits for many users, they present unique challenges for individuals with various disabilities. For users with manual dexterity limitations, traditional interaction methods requiring precise movements or significant physical reach can be difficult or impossible to use effectively.

For visually impaired users, the challenges are particularly acute with contactless technologies. The contactless readers typically feature only flat, printed logos without tactile differentiation, making them difficult to locate by touch. This issue is compounded by standardization requirements, such as the Europay®, Mastercard®, and Visa® (EMV) company specifications, which mandate specific visual logos without incorporating tactile elements that would benefit blind users.

Wireless audio capabilities, while offering freedom from physical tethering to terminals, introduce additional complications. Users with hearing impairments often require customized audio experiences with control over volume, speed, and pitch-features not commonly offered in current implementations. Additionally, the process of initiating wireless audio connections often relies on the same difficult-to-locate near filed communication (NFC) targets that challenge visually impaired users in payment scenarios.

The combination of these challenges creates significant barriers to accessibility across multiple user groups. Users with cognitive impairments or low literacy may struggle with standard audio feedback that cannot be adjusted to their needs. Those with both visual and dexterity limitations face compounded difficulties when attempting to use contactless technologies, as they cannot easily see or feel the target areas and may struggle with the precise movements required.

In addressing the technological problems of accessibility in SSTs, particularly for contactless tokens and wireless audio features, various technological enhancements are implemented to create more inclusive user experiences. These technological improvements leverage physical design modifications, electronic feedback systems, and novel input methodologies to overcome the inherent limitations of current contactless interfaces.

In an embodiment discussed herein, a contactless reader incorporates raised tactile features to help blind users locate the contactless target area. These features may include raised radiating lines in the logo, a raised border around the target area, or other tactile elements that allow users who are blind to locate the target through touch. When combined with private audio guidance, these features significantly improve the ability of visually impaired users to correctly position their contactless tokens.

In various embodiments presented herein, light patterns around the edge or in close proximity to the contactless target provide enhanced visual feedback. These lights can use one pattern of subtle light pulses to guide attention to the target, particularly benefiting partially sighted users, and different light feedback patterns to indicate success or failure of read or write operations.

In an embodiment, localized haptic vibration provides feedback and location assistance. This can include subtle vibration patterns during periods when the user needs to locate the contactless read target, different vibration types to signal success or failure of operations, and potentially other vibration patterns when the contactless token is used as an additional input method.

In an embodiment discussed herein, the contactless token itself becomes a novel additional input method. Because contactless tokens can be read at distances up to 40 mm from the reader, this capability is exploited to use the distance range as an input method. As the user moves the token closer to or further from the reader, feedback changes to enable the user to perceive their proximity to the reader. That is, graduated feedback is provided based on the distance of the contactless token from a target area of a contactless reader. This distance-based input can be combined with movements in the X and Y axes at fixed distances to create multiple input streams, particularly beneficial for SSTs without touch-screens or keypads.

In various embodiments presented below, enhanced control over audio parameters provides significant benefits for users with hearing impairments or cognitive disabilities. These controls include volume adjustment, navigation (next/previous), pause, repeat, speed control, and pitch modification. These audio controls can be manipulated through the contactless token input method described above, or through alternative input methods including touchscreen gestures, speech input, mid-air gestural input captured by optical sensors, universal navigator controls, or dedicated physical controllers.

In an embodiment, a dedicated physical controller provides multiple input dimensions. This controller allows rotation around the central Y axis, partial rotation around the X and Z axes enabling pivoting up/down/left/right and touch gestural input on the top surface. This multi-dimensional input device provides rich control capabilities for audio and other parameters.

As used herein, the words "user," "customer," and/or "consumer" may be used interchangeably and synonymously. This is an individual that performs a self-service transaction at an SST with the enhanced contactless accessibility features presented herein activated.

FIG. 1 is a diagram of a contactless reader 100, according to an example embodiment. Notably, the components are shown schematically in simplified form, with only those components relevant to understanding of the embodiments being illustrated.

Furthermore, the various components (that are identified in contactless reader 100) are illustrated and the arrangement of the components are presented for purposes of illustration only. Notably, other arrangements with more or less components are possible without departing from the teachings of contactless and audio accessibility during self-service transaction at SSTs, presented herein and below.

The contactless reader 100 is integrated into an existing SST as a peripheral device of the SST. The contactless reader 100 includes a processor 101, a non-transitory computer-readable memory or storage medium ("medium") 102, an optional display 105, a target area 106, lights 107, a haptic device 108 or a vibration device, and optionally a dedicated physical control 109. The medium 102 is coupled to the processor 101 and includes instructions for a feedback system 103 and a detection system 104. The target area 106 includes a wireless transceiver 106-1 and tactile features 106-2. The optional dedicated physical control 109 includes a control element 109-1 and/or capacitive touch sensors 109-2.

The target area 106 includes an outer shell housing portion upon which a specific area is visible for a user to tap a contactless card or a phone with a contactless token for purposes of identifying the user and/or paying for a transaction at an SST. The specific area typically includes a logo with written indicia that may state tap here. Behind the outer shell portion of the target area 106 is the wireless transceiver 106-1, which is capable of reading a contactless token or contactless card, when the user taps or places the token/card on or in close proximity to the specific area.

The outer shell housing portion of the target area 106 further includes the tactile features 106-2. In an embodiment, the tactile features 106-2 include raised features, such as bumps or ridges, of varying thickness and heights to enable blind users to locate the specific area to have their contactless token or contactless card read during a self-service transaction at the SST. In an embodiment, the tactile features 106-2 are also or only located in a border area of the specific area within the target area 106 to assist the user in locating the specific area. In an embodiment, the tactile features 106-2 are included within the logo on the outer shell housing portion. In an embodiment, the feedback system 103 also causes the SST to provide private audio guidance to the user to correctly locate the target area 106.

In an embodiment, lights 107 are located around the edge or in close proximity to the target area 106. Feedback system 103 controls illumination of the lights 107 in various patterns after detection system 104 detects a contactless token or contactless card near or in proximity to the target area 106. In an embodiment, feedback system 103 controls lights 107 to use a first pattern of subtle light pulses to guide the user's device (e.g., card, phone, wearable device, etc.) held by the user to the target area 106. In an embodiment, the feedback system 103 controls lights 107 in a different set of feedback light patterns depending upon success or failure in reading the contactless token or contactless card by the contactless reader 100.

In an embodiment, feedback system 103 controls haptic device 108 to provide localized haptic vibrations to assist the user in locating the target area 106. For example, one subtle vibration pattern is activated during periods when the user needs to locate the target area 106, a different type of vibration to signal success of failure of read or write operations with respect to the contactless token or contactless card, and yet another type of vibration in the case that the contactless token or contactless card is to be used as an input method.

In an embodiment, the detection system 104 and feedback system 103 cooperate to use auditory guidance, visual guidance via lights 107, and haptic feedback via haptic device 108 as an input method. For instance, because contactless tokens or contactless cards can be read a predefined distance from the wireless transceiver 106-1 (e.g., at least 40 mm distance away), this is exploited by feedback system 103 and detection system 104 to use the distance from 40 mm to 0 mm as an input method. As the user moves the contactless token or contactless card closer to the wireless transceiver 106-1 as detected by the detection system 104, the feedback system 103 customizes audio, light, and/or haptic feedback being provided to the user. This enables the user to perceive how close or far away their contactless token is to the wireless transceiver 106-1. The user can use the detection system's calculated distance of the contactless card from the wireless transceiver as input information to the SST during the self-service transaction. In an embodiment, movements in the X-axis at a fixed distance from transceiver 106-1 can provide a first input stream, movements in the Y-axis at a fixed distance can provide a second input stream, and movements in the Z-axis (i.e., closer or farther away from the transceiver 106-1) as a third input stream. The input streams can then be processed by the SST to execute transaction features such as changing the volume of the audio, navigating to a next or a previous audio guidance instruction, repeating a previous audio guidance instruction, slowing down audio guidance, speeding up audio guidance, pausing audio guidance, increasing the audio pitch up, decreasing the audio pitch down, etc.

In an embodiment, the contactless token is used by the user to pair a user's device for private audio. The user's initial tap of the contactless token in the target area 106 permits the SST and the user's device to pair for private audio guidance during a self-service transaction. Any of the above noted embodiments or combinations of the above noted embodiments may be used to provide the user guidance in establishing the private audio between the user's device and the SST. Furthermore, by using the input streams discussed above based on the distance of the contactless token from the wireless transceiver 106-1, the user has more control over the audio channel, which can be particularly beneficial for those customers who have some level of hearing impairment, along with customers who may have low literacy, or some cognitive impairments. Thus, once the user's device is paired to the terminal, the user can use the contactless card to enhance the audio and audio guidance in a manner preferred or needed by the user for changing the volume of the audio, navigating to a next or a previous audio guidance instruction, repeating a previous audio guidance instruction, slowing down audio guidance, speeding up audio guidance, pausing audio guidance, increasing the audio pitch up, decreasing the audio pitch down, etc.

Thus, in some embodiments, the contactless token itself is used as an input method to the SST during a self-service transaction. The user manipulates the contactless token around the target area 106 to effectuate changes in audio characteristics and audio guidance during the self-service transaction.

In an embodiment, the input methods for controlling audio guidance at the SST during a self-service transaction may also be used via gestures made on the touchscreen display of the SST, speech inputted from the user, mid-air gestural input captured by an optical sensor of the SST, an accessibility input controller of the SST, etc. In an embodiment, the card reader 100 includes a dedicated physical controller 109. The dedicated physical controller 109 includes a control element 109-1 and/or capacitive touch sensors 109-2. The control element 109-1 is a rotating control that allows rotation around the central Y-axis, but also allows partial rotation around the X and Z axis, which allows the control element to 'pivot' up/down/left/right to given additional input instructions to the SST during the self-service transaction. In an embodiment, the capacitive touch sensors 109-2 allows the user to provide touch gestural input on the top surface allowing for addition input instructions to the SST during the self-service transaction.

In an embodiment, the optical sensors 207 include depth-sensing cameras capable of tracking the three-dimensional position of objects in front of the SST 200. This enables the contactless accessibility manager 204 to detect and interpret mid-air gestures performed by users who may prefer not to touch any part of the terminal. The mid-air gesture recognition can be particularly beneficial for users with certain mobility impairments who can make arm movements but have difficulty with fine motor control required for touch-screen or physical button interaction.

In an embodiment, the contactless reader 100 includes environmental sensors that detect ambient conditions such as lighting levels and background noise. The feedback system 103 automatically adjusts the intensity of visual and audio feedback based on these environmental conditions, ensuring that feedback remains perceivable in various settings. For example, in bright sunlight, the lights 107 may increase in intensity, while in quiet environments, audio feedback volume may be reduced while maintaining clarity.

Figure 2:
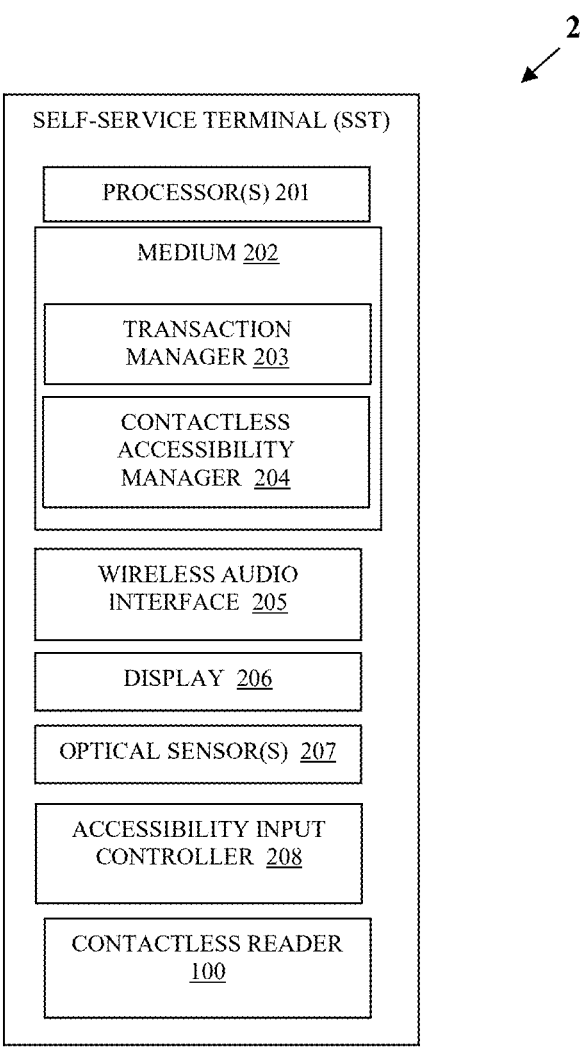
FIG. 2 is diagram of a self-service terminal (SST) with the contactless reader, according to an example embodiment.

FIG. 2 is diagram of an SST 200 with contactless reader 100 integrated into the SST 200 as a peripheral device of the SST 200, according to an example embodiment. Notably, the components are shown schematically in simplified form, with only those components relevant to understanding of the embodiments being illustrated.

Furthermore, the various components (that are identified in contactless reader 100) are illustrated and the arrangement of the components are presented for purposes of illustration only. Notably, other arrangements with more or less components are possible without departing from the teachings, features, benefits, and functions of contactless and audio accessibility during self-service transaction at SST 200, presented herein and below.

SST 200 includes at least one processor 201, a medium 202, a wireless audio interface 205, a display 206, one or more optical sensors 207, an optional accessibility input controller 208, and the contactless reader 100. The medium 202 includes instructions for a transaction manager 203 and a contactless accessibility manager 204. The instructions when executed by the processor 201 cause the processor to perform the operations discussed herein with respect to transaction manager 203 and contactless accessibility manager 204.

Transaction manager 203 controls the transaction interface and transaction states during self-service transactions at the SST 200. Contactless accessibility manager 204 interacts with contactless card reader 100 to read contactless tokens and adjust audio characteristics and audio guidance based on input streams provided by detection system 104, dedicated physical controller 109, optical sensors 207, and/or accessibility input controller 208.

In an embodiment, the accessibility input controller 208 is a physical controller that permits the user to adjust accessibility settings and also navigate transaction interface screens during a self-service transaction. In an embodiment, the accessibility input controller 208 includes 4 arrow keys that move in four directions, a center where the 4 arrow keys meet provides a select key for activation by the user. Thus, the accessibility input controller includes 5 keys, 4 directional keys, and 1 selection key. In an embodiment, the accessibility input controller 208 also includes integrated private audio feedback as discussed herein and above.

Wireless audio interface 205 includes a speaker for providing natural language audio guidance to the user during a self-service transaction. Contactless accessibility manager 204 controls the audio characteristics and natural language audio guidance provided to the wireless audio interface 205.

In an embodiment, optical sensor 207 captures mid-air user gestural input for audio accessibility guidance and characteristics. Contactless accessibility manager 204 translates the images associated with the mid-air gestural input into audio characteristics and audio guidance provided through the wireless audio interface 205.

In an embodiment, the contactless token accessibility manager 204 provides audio feedback that varies in pitch based on the horizontal position of the contactless token relative to the target area 106. For example, as the user moves the contactless token from left to right across the target area 106, the audio feedback shifts from a lower to a higher pitch, creating an audio spatial map that helps blind users locate the center of the target area 106. Similarly, vertical movement can be represented by changes in volume or audio pulse frequency, creating a comprehensive audio-spatial guidance system.

In an embodiment, the contactless token accessibility manager 204 implements a learning algorithm that adapts to individual user interaction patterns over time. The contactless token accessibility manager 204 records successful contactless token interactions and adjusts feedback intensity and timing based on the user's demonstrated proficiency. For frequent users who consistently locate the target area 106 quickly, the contactless token accessibility manager 204 may provide more subtle guidance, while offering more intensive feedback for users who demonstrate difficulty or are using the system for the first time. This personalized approach enhances accessibility while maintaining an efficient transaction flow for all users.

In an embodiment, the contactless token accessibility manager 200 provides multi-language support for audio guidance. The contactless token accessibility manager 200 detects the preferred language based on the user's contactless token information or previous interactions with the SST 200, and automatically provides audio guidance in that language. This feature particularly benefits users with visual impairments who may have difficulty navigating language selection menus on traditional visual interfaces.

In an embodiment, the contactless token accessibility manager 200 implements a security feature that requires specific gestural patterns with the contactless token to authorize certain transaction types. For example, a simple tap might be sufficient for balance inquiries, while a specific movement pattern (such as a figure-eight motion at a particular distance from the reader) might be required for cash withdrawals. This provides an additional layer of security while maintaining accessibility for users with various disabilities.

FIG. 3 is a flow diagram of a method 300 of enhancing accessibility of the contactless reader at the SST 200, according to an example embodiment. The method 300 can be executed as instructions on contactless reader 100, SST 200, or a combination of contactless reader 100 and SST 200. The instructions executed are referred to as "a contactless token accessibility manager." The contactless token accessibility manager may have access to a network during its operation, the network may be wired, wireless, or a combination of wired and wireless. In an embodiment, the contactless token accessibility manager any combination of feedback system 103, detection system 104, and/or contactless accessibility manager 204.

At 310, the contactless token accessibility manager provides a contactless reader 100 with a target area 106 for reading a contactless token at an SST 200. At 320, the contactless token accessibility manager incorporates tactile features 160-2 on or around the target area 106 to enable location by touch. In an embodiment, at 321, the tactile features 106-2 include raised radiating lines in a logo, a raised border around the target area 106, or raised patterns that allow blind users to locate the target area 106.

At 330, the contactless token accessibility manager implements a feedback system 103 that provides at least one visual feedback through light pattern feedback and/or haptic feedback through vibration patterns. In an embodiment, at 331, the visual feedback includes different light patterns to include guidance to the target area 106, successful reading of the contactless token, and/or failed reading of the contactless token. In an embodiment, the haptic feedback includes different vibration patterns to include guidance to the target area 106, successful reading of the contactless token, and/or failed reading of the contactless token.

At 340, the contactless token accessibility manager detects a contactless token within a predetermined distance from the target area. In an embodiment, detection system 104 calculates the distance.

At 350, the contactless token accessibility manager determines a position of the contactless token relative to the target area 106. In an embodiment, detection system 104 continuously and dynamically calculates the position of the contactless token relative to the target area 106.

At 360, the contactless token accessibility manager interprets changes in the position of the contactless token as input commands for controlling terminal functions associated with accessibility. In an embodiment, at 361, the contactless token accessibility manager detects movement in an X-axis at a fixed distance from the contactless reader 100 as a first input stream; detects movement in a Y-axis at a fixed distance as a second input stream; and detects movement in a Z-axis representing a distance from the contactless reader as a third input stream. The input streams are used as input to the SST to control the terminal functions associated with accessibility.

In an embodiment, at 370, the contactless token accessibility manager establishes a wireless audio connection between the SST 200 and a user device. The contactless token accessibility manager controls or modifies audio parameters of the wireless audio connection based on interpreted changes in the position of the contactless token. In an embodiment, at 371, the audio parameters include at least one of volume control, playback navigation, pause, repeat, playback speed, and audio pitch.

In an embodiment, at 380, the contactless token accessibility manager provides audio guidance through a private audio channel to assist the user in locating the target area 106. In an embodiment, the private audio channel is established through wireless audio interface 205.

In an embodiment, at 390, the contactless token accessibility manager provides a dedicated physical controller 109 for controlling the terminal functions. The dedicated physical controller 109 include a control that allows rotation around a central Y-axis, a pivot control that allows partial rotation around a X axis and a Z axis, and a touch-sensitive surface that accepts gestural input, via capacitive touch sensors 109-2.

In an embodiment, at 395, the SST is an ATM. The contactless token is a contactless card, an NFC-enabled mobile phone, tablet, or a wearable device.

In an embodiment, the contactless token accessibility manager detects mid-air gestural input through an optical sensor 207. The contactless token accessibility manager controls terminal functions based on detected mid-air gestural input.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   providing a contactless reader with a target area for reading contactless token at a self-service terminal (SST);
   incorporating tactile features on or around the target area to enable location by touch;
   implementing a feedback system that provides at least one of visual feedback through light pattern feedback or haptic feedback through vibration patterns;
   detecting a contactless token within a predetermined distance range from the target area;
   determining a position of the contactless token relative to the target area in at least one dimension; and interpreting changes in the position of the contactless token as input commands for controlling terminal functions associated with accessibility.

2. The method of claim 1, wherein the tactile features comprise at least one of raised radiating lines in a logo, a raised border around the target area, and raised patterns that allow blind users to locate the target area.

3. The method of claim 1, wherein the visual feedback comprises different light patterns to indicate at least one of: guidance to the target area, successful reading of the contactless token, or failed reading of the contactless token.

4. The method of claim 1, wherein the haptic feedback comprises different vibration patterns to indicate at least one of: guidance to the target area, successful reading of the contactless token, or failed reading of the contactless token.

5. The method of claim 1, wherein interpreting changes in the position of the contactless token comprises:
detecting movement in an X-axis at a fixed distance from the contactless reader as a first input stream;
detecting movement in a Y-axis at a fixed distance from the contactless reader as a second input stream; and
detecting movement in a Z-axis representing distance from the contactless reader as a third input stream.

6. The method of claim 1, further comprising:
establishing a wireless audio connection between the SST and a user device; and
controlling audio parameters of the wireless audio connection based on interpreted changes in position of the contactless token.

7. The method of claim 6, wherein the audio parameters comprise at least one of: volume, playback navigation, pause, repeat, playback speed, and pitch.

8. The method of claim 1, further comprising providing audio guidance through a private audio channel to assist a user in locating the target area.

9. The method of claim 1, further comprising:
providing a dedicated physical controller for controlling terminal functions;
wherein the dedicated physical controller comprises:
a control that allows rotation around a central Y-axis;
a pivoting control that allows partial rotation around an X-axis and a Z-axis; and
a touch-sensitive surface that accepts gestural input.

10. The method of claim 1, wherein the SST is an automated teller machine (ATM), and wherein the contactless token is one of: a contactless card, a near field communication-enabled mobile phone, or a wearable device.

11. The method of claim 1, further comprising:
detecting mid-air gestural input through an optical sensor; and
controlling terminal functions based on detected mid-air gestural input.

12. A self-service terminal (SST), comprising:
a processor;
a memory coupled to the processor;
a display; and
a contactless reader with a target area enabled to read contactless tokens, the contactless reader comprising:
tactile features on or around the target area to enable location by touch; and
a feedback system configured to provide at least one of visual feedback through light patterns and haptic feedback through vibration patterns;
wherein the processor is configured to:
detect a contactless token within a predetermined distance range from the target area;

determine a position of the contactless token relative to the target area in at least one dimension; and
interpret changes in the position of the contactless token as input commands for controlling terminal functions.

13. The SST of claim 12, further comprising a wireless audio interface configured to establish a wireless connection with a user device for providing audio feedback.

14. The SST of claim 13, wherein the processor is further configured to modify audio parameters of the audio feedback based on interpreted changes in position of the contactless token, the audio parameters including at least one of: pitch, speed, and volume.

15. The SST of claim 12, wherein the contactless reader further comprises:
a dedicated physical controller comprising:
a control element that rotates in multiple axes; and
capacitive touch sensors on a surface of the control element;
wherein the processor is configured to interpret input from the dedicated physical controller to control audio parameters.

16. The SST of claim 12, wherein the processor is further configured to:
detect when a user is having difficulty locating the target area; and
activate enhanced feedback to guide the user to the target area.

17. The SST of claim 12, wherein the contactless reader is configured to:
detect a distance of the contactless token from the target area; and
provide graduated feedback that changes as the contactless token moves closer to or farther from the target area.

18. The SST of claim 12, further comprising:
an optical sensor configured to detect mid-air gestures;
wherein the processor is configured to interpret detected mid-air gestures as input commands for controlling terminal functions.

19. A contactless reader, comprising:
a target area configured to read contactless tokens;
tactile features incorporated on or around the target area to enable location by touch;
a feedback system configured to provide at least one of visual feedback through light patterns and haptic feedback through vibration patterns;
a detection system configured to detect a contactless token within a predetermined distance range from the target area and determine a position of the contactless token relative to the target area in at least one dimension; and
a processor configured to interpret changes in the position of the contactless token as input commands for controlling terminal functions.

20. The contactless reader of claim 19, wherein the feedback system is configured to:
detect when the contactless token is approaching the target area;
increase intensity of a feedback as the contactless token gets closer to an optimal reading position;
decreasing intensity of the feedback as the contactless token gets farther away from the target area; and
provide confirmation feedback when the contactless token is successfully read.

*     *     *     *     *